United States Patent
Ji et al.

(10) Patent No.: US 8,218,673 B2
(45) Date of Patent: Jul. 10, 2012

(54) METHOD AND SYSTEM FOR PROVIDING A DUAL-CHANNEL BEACON SIGNAL IN A WIRELESS NETWORK

(75) Inventors: Baowei Ji, Plano, TX (US); David Mazzarese, Suwon (KR); Kathiravetpillai Sivanesan, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 811 days.

(21) Appl. No.: 11/764,421

(22) Filed: Jun. 18, 2007

(65) Prior Publication Data

US 2008/0043863 A1 Feb. 21, 2008

Related U.S. Application Data

(60) Provisional application No. 60/838,095, filed on Aug. 15, 2006, provisional application No. 60/844,920, filed on Sep. 15, 2006.

(51) Int. Cl.
*H04L 27/00* (2006.01)

(52) U.S. Cl. .................... 375/295; 375/146; 375/147

(58) Field of Classification Search .................. 375/302, 375/354, 355, 362, 364, 365, 146, 147, 295
See application file for complete search history.

(56) References Cited

U.S. PATENT DOCUMENTS

| | | | |
|---|---|---|---|
| 2004/0218570 A1* | 11/2004 | Black et al. | 370/335 |
| 2005/0124355 A1* | 6/2005 | Cromer et al. | 455/456.5 |
| 2006/0045059 A1* | 3/2006 | Yun et al. | 370/338 |
| 2006/0268880 A1* | 11/2006 | Zhao et al. | 370/394 |

* cited by examiner

*Primary Examiner* — Chieh M. Fan
*Assistant Examiner* — Freshteh N Aghdam

(57) ABSTRACT

A method for providing a dual-channel beacon signal to protect a low-power device in a wireless network is provided. The method includes generating a beacon message in a first logical channel and generating a detection signal in a second logical channel. The first logical channel and the second logical channel are mapped into a first physical channel and a second physical channel. The second physical channel is orthogonal to the first physical channel. The dual-channel beacon signal is transmitted by simultaneously transmitting the beacon message and the detection signal in the first physical channel and the second physical channel.

25 Claims, 7 Drawing Sheets

METHOD AND SYSTEM FOR PROVIDING A DUAL-CHANNEL BEACON SIGNAL IN A WIRELESS NETWORK

CROSS-REFERENCE TO RELATED APPLICATIONS AND CLAIM OF PRIORITY

The present application is related to U.S. Provisional Patent No. 60/838,095, filed Aug. 15, 2006, titled "Generic Beacon Design for Fast Beacon Detection Independent of Message Load," and to U.S. Provisional Patent No. 60/844,920, filed Sep. 15, 2006, titled "Dual-Channel Beacon with Complex Spreading." U.S. Provisional Patent Nos. 60/838,095 and 60/844,920 are assigned to the assignee of the present application and are hereby incorporated by reference into the present disclosure as if fully set forth herein. The present application hereby claims priority under 35 U.S.C. §119(e) to U.S. Provisional Patent Nos. 60/838,095 and 60/844,920.

TECHNICAL FIELD OF THE INVENTION

The present application relates generally to wireless communication networks and, more specifically, to a method and system for providing a dual-channel beacon signal in a wireless network.

BACKGROUND OF THE INVENTION

Wireless regional area networks (WRANs) operate using a cognitive radio-based approach in which the target spectrum includes unused channels that have been allocated for television broadcast services. In order to avoid interference, TV broadcast stations that are being used in any given region may be detected and avoided by devices functioning as part of a WRAN. However, some low-powered devices, such as wireless microphones and other devices licensed under Part 74 of the Federal Communication Commission rules (i.e., Part 74 devices), are more difficult to detect and avoid than TV broadcast stations because of their low transmit power and other factors.

For example, some wireless microphones and other Part 74 devices have a limited coverage of around 200 meters. Thus, systems located far away (e.g., a base station located 30 km away) are unable to sense and protect those low-power devices. One proposed solution to this problem involves the use of a beacon device associated with a low-power device. The beacon device has a much larger coverage (e.g., around 35 km) and is thus able to alert other wireless systems to the presence of the low-power device. The challenges of designing such a beacon device include cost and high reliability of beacon signal detection.

In one proposed design, a long symbol is used for coping with multipath fading without using complicated signal detection methods, such as equalization, channel estimation, or OFDM modulation. One of the disadvantages of this design is that a long symbol implies a low data rate, which in turn requires a long sensing period for detecting the beacon signal. For example, about 4.567 msec are needed for detecting a 24-bit burst, and about 68.5 msec are needed for detecting a 360-bit beacon PSDU. Since a long series of synchronization bits is sent before sending a beacon PSDU, this beacon design fails to meet the requirement in 802.22 functional requirements document that the transmission of a low-power device needs to be detected and protected within two seconds. Therefore, there is a need in the art for an improved method for providing a beacon signal to protect a low-power device in a wireless network.

SUMMARY OF THE INVENTION

A method for providing a dual-channel beacon signal to protect a low-power device in a wireless network is provided. According to an advantageous embodiment of the present disclosure, the method includes generating a beacon message in a first logical channel and generating a detection signal in a second logical channel. The first logical channel and the second logical channel are mapped into a first physical channel and a second physical channel. The second physical channel is orthogonal to the first physical channel. The dual-channel beacon signal is transmitted by simultaneously transmitting the beacon message and the detection signal in the first physical channel and the second physical channel.

According to another embodiment of the present disclosure, a method for processing a dual-channel beacon signal transmitted to protect a low-power device in a wireless network is provided that includes receiving the dual-channel beacon signal, which includes a detection signal and a beacon message that are transmitted simultaneously. The dual-channel beacon signal is identified based on the detection signal, and interference with the low-power device is avoided based on the beacon message.

According to yet another embodiment of the present disclosure, a transmitter capable of providing a dual-channel beacon signal to protect a low-power device in a wireless network is provided that includes an encoder, a first modulator, a second modulator, an adder and a complex spreader. The encoder is operable to encode data in a first physical channel to generate an encoded signal. The first modulator is coupled to the encoder and is operable to modulate the encoded signal to generate a first modulated signal. The second modulator is operable to modulate data in a second physical channel to generate a second modulated signal. The second physical channel is orthogonal to the first physical channel. The adder is coupled to the first and second modulators and is operable to sum the first and second modulated signals to generate a combined signal. The complex spreader is coupled to the adder and is operable to spread the combined signal using a complex sequence to generate the dual-channel beacon signal, which includes a beacon message and a detection signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or" is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
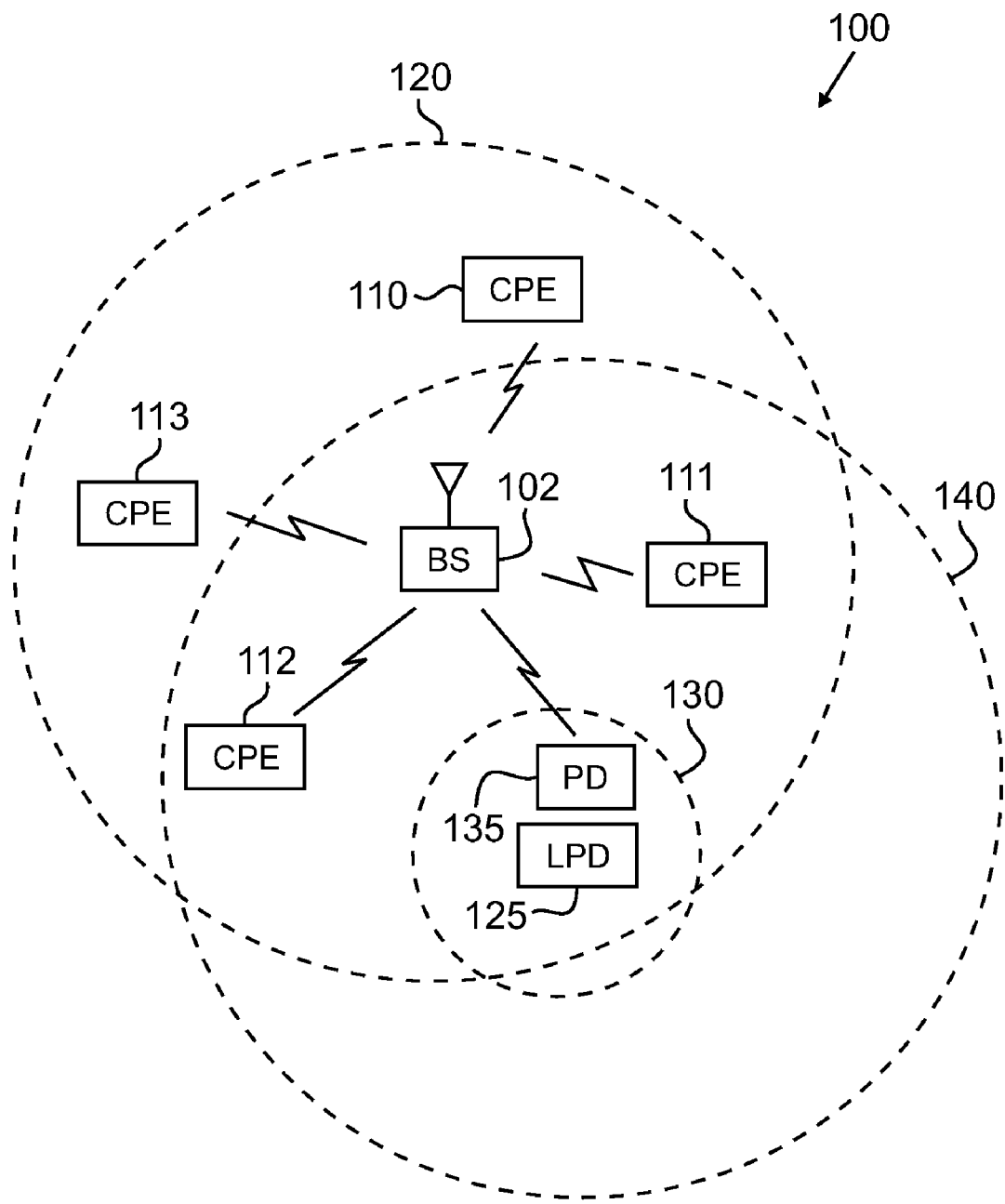
FIG. 1 illustrates a wireless network capable of providing a dual-channel beacon signal to protect a low-power device according to an embodiment of the disclosure.

FIG. 1 illustrates a wireless network 100 capable of providing a dual-channel beacon signal to protect a low-power device according to an embodiment of the disclosure. Wireless network 100 may comprise a wireless regional area network (WRAN). Wireless network 100 comprises at least one base station (BS) 102 that is operable to provide service to a plurality of non-interfering customer premises equipment (CPE) devices 110-113 within a cell 120.

As used herein, a "non-interfering CPE" means a device that is allowed to operate in the television bands on a non-interfering basis as part of wireless network 100. Thus, for example, if one or more particular channels allocated for broadcast television are unused in a particular region, a WRAN such as wireless network 100 may be implemented in which CPEs 110-113 are able to operate using the unused channels such that no interference is seen by the television channels that are being used.

Dotted lines show the approximate boundaries of cell 120 in which base station 102 is located. Cell 120 is shown approximately circular for the purposes of illustration and explanation only. It should be clearly understood that cell 120 may have other irregular shapes, depending on the cell configuration selected and variations in the radio environment associated with natural and man-made obstructions. Although the embodiment of FIG. 1 illustrates base station 102 in the center of cell 120, the system of the present disclosure is not limited to any particular cell configuration. Base station 102 is operable to manage wireless communication resources for cell 120.

Within cell 120, one or more low-power devices (LPDs) 125 may exist. As used herein, a "low-power device" means a wireless microphone or other Part 74 device or any other suitable device that may operate in the same television bands as CPEs 110-113 and that is operable to transmit within a limited coverage area 130. As used herein, a "limited coverage area" means a coverage area that is less than the range of base station 102. Thus, a signal transmitted by low-power device 125 travels a shorter distance (corresponding to limited coverage area 130) than a signal transmitted by base station 102 (which travels a distance corresponding to cell 120).

Therefore, base station 102 and CPEs 110-113 may be unable to detect the presence of low-power device 125 based on transmissions from low-power device 125 when low-power device 125 is not relatively close. As a result, when low-power device 125 is operating within the same unused television channels as base station 102 and CPEs 110-113, base station 102 and/or CPEs 110-113 may interfere with the operation of low-power device 125. For example, when low-power device 125 comprises a wireless microphone, signals transmitted by base station 102 or CPEs 110-113 may be received at a wireless microphone receiver that is receiving signals from the wireless microphone. Accordingly, the signals from base station 102 and/or CPEs 110-113 may interfere with the wireless microphone signals, causing the wireless microphone receiver to malfunction.

Therefore, in order for base station 102 and CPEs 110-113 to detect the presence of low-power device 125 and avoid interfering with its operation, a protecting device (PD) 135 may be provided for low-power device 125. Protecting device 135 is operable to transmit a beacon signal to nearby base stations, such as base station 102, and CPEs, such as CPEs 111-112, on the same channel in which the low-power device 125 is operating. The beacon signal comprises information relevant to low-power device 125, such as a physical location, estimated duration of channel occupancy, time, height of protecting device 135, and the like.

Protecting device 135 is operable to transmit the beacon signal a longer distance than the signals transmitted by low-power device 125. Thus, protecting device 135 may transmit the beacon signal within a protection zone 140 that is comparable to the size of a cell 120. For example, for one particular embodiment, cell 120 may comprise a radius of approximately 30 kilometers, limited coverage area 130 may comprise a radius of approximately 200 meters, and protection zone 140 may comprise a radius of approximately 35 kilometers. However, it will be understood that cell 120, limited coverage area 130 and protection zone 140 may be any suitable sizes.

Because protecting device 135 is able to transmit the beacon signal the larger distance associated with protection zone 140 (as compared to the shorter distance associated with limited coverage area 130), base station 102 and nearby CPEs 111-112 are operable to receive the beacon signal. Based on the beacon signal, base station 102 and nearby CPEs 111-112 are operable to avoid using the same portion of an unused television channel that is being used by low-power device 125. Therefore, low-power device 125 is protected by the beacon signal transmitted by protecting device 135.

Protecting device 135 comprises two logical transmission channels: a beacon channel and a detection channel. The detection channel is operable to provide the detection signal to enable fast beacon detection, as well as to notify other systems when to start receiving the beacon message for some embodiments. The beacon channel is operable to provide the beacon message. As described in more detail below, these two logical channels are mapped into two physical channels that are orthogonal and spread using a complex sequence. Thus, protecting device 135 is operable to transmit simultaneously a beacon message and a detection signal on the orthogonal channels. In this way, protecting device 135 is able to provide a dual-channel beacon signal that comprises both the detection signal and the beacon message simultaneously.

Figure 2:
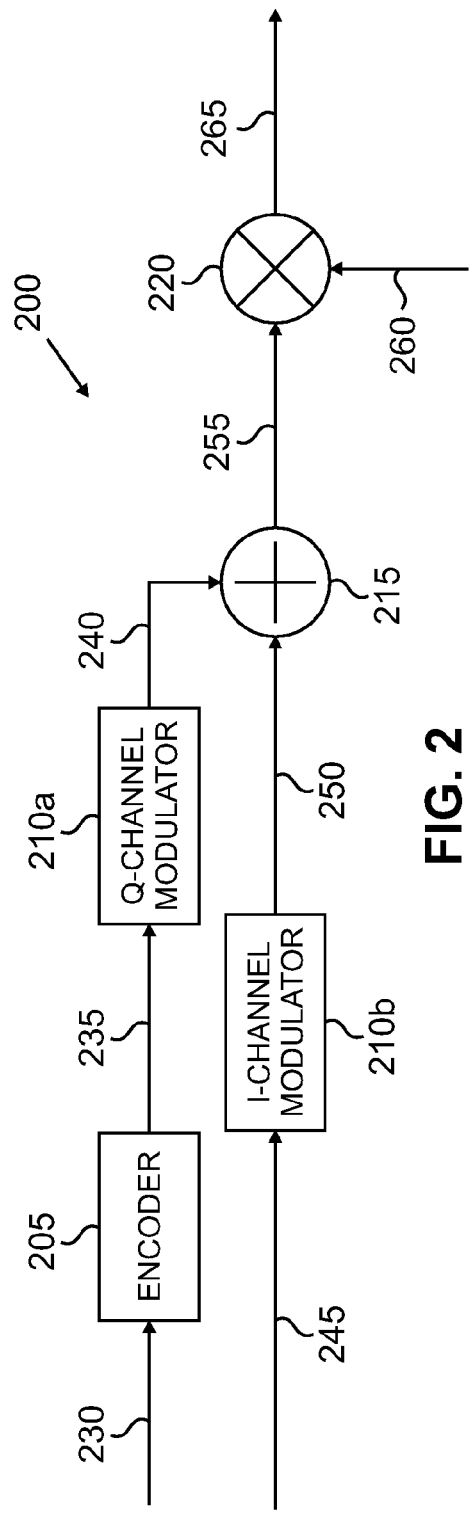
FIG. 2 illustrates a transmitter that is capable of transmitting a dual-channel beacon signal to protect the low-power device of FIG. 1 according to an embodiment of the present disclosure.

FIG. 2 illustrates a transmitter 200 that is capable of transmitting a dual-channel beacon signal to protect low-power device 125 according to an embodiment of the present disclosure. Thus, transmitter 200 may correspond to protecting device 135 of FIG. 1. Transmitter 200 comprises an encoder 205, modulators 210a-b, an adder 215, and a complex spreader 220. For one embodiment, modulator 210a comprises a Q-channel modulator and modulator 210b comprises an I-channel modulator. It will be understood that transmitter 200 comprises additional components not illustrated in FIG. 2.

For the embodiment described below, encoder 205 and modulator 210a are operable to process a beacon message 230, while modulator 210b is operable to process a detection signal 245. The beacon message 230 is provided in a logical beacon channel, and the detection signal 245 is provided in a logical detection channel. Thus, for this embodiment, the logical beacon channel is mapped into the physical Q channel, and the logical detection channel is mapped into the physical I channel. However, for other embodiments, the signals 230 and 245 may each comprise portions of both the beacon message and the detection signal. Thus, the logical beacon channel and the logical detection channel may each be mapped into both the physical Q channel and the physical I channel in any suitable manner. For simplicity of description, however, the particular embodiment described below will refer to the signal 230 as the beacon message and the signal 245 as the detection signal 245.

Encoder 205 is operable to receive the beacon message 230 as traffic data and to encode the beacon message 230 in order to generate an encoded beacon message 235. Q-channel modulator 210a is coupled to encoder 205 and is operable to receive the encoded beacon message 235 and to modulate the encoded beacon message 235 in order to generate a modulated beacon message 240. I-channel modulator 210b is operable to receive the detection signal 245 as pilot data and to modulate the detection signal 245 in order to generate a modulated detection signal 250. Modulators 210a-b may be operable to use differential quadrature phase shift keying (DQPSK), differential binary phase shift keying (DBPSK), BPSK, or any other suitable modulation scheme.

Adder 215, which is coupled to both modulators 210a-b, is also operable to receive the modulated beacon message 240 and the modulated detection signal 250 and to add the modulated beacon message 240 to the modulated detection signal 250 in order to generate a combined signal 255. The combined signal 255 may comprise a single frequency band signal.

Complex spreader 220 is coupled to adder 215 and is operable to receive the combined signal 255, as well as a complex spreading signal 260. Based on the complex spreading signal 260, complex spreader 220 is operable to spread the combined signal 255 in order to generate a dual-channel beacon signal 265, which comprises both the beacon message 230 and the detection signal 245. The beacon message may comprise the actual beacon data, which includes information relevant to low-power device 125, such as a physical location, estimated duration of channel occupancy, time, height of transmitter 200, and the like. The detection signal 245 may comprise a synchronization signal, a pilot signal or other suitable signal operable to allow a receiver to detect the presence of the dual-channel beacon signal 265.

The complex spreading signal 260 comprises a complex sequence. For one embodiment, transmitter 200 may use a single predetermined sequence as the complex spreading signal 260. For another embodiment, transmitter 200 may be operable to select a sequence for use as the complex spreading signal 260 from a plurality of possible sequences, either randomly or based on any suitable algorithm.

For a particular embodiment, the complex spreading signal 260 may comprise one of the following complex sequences that is either predetermined or selected by transmitter 200 (with each chip, x±yi, having an amplitude of I defined as x and an amplitude of Q defined as y):

Sequence 1
1+0i, 0+1i, 0+1i, −1+0i, 0+1i, −1+0i, −1+0i, 0−1i, 0+1i, −1+0i, −1+0i, 0−1i, −1+0i, 0−1i, 0−1i, 1+0i Sequence 2
0−1i, −1+0i, 1+0i, 0−1i, 1+0i, 0−1i, 0+1i, 1+0i, 1+0i, 0−1i, 0+1i, 1+0i, 0+1i, 1+0i, −1+0i, 0+1i Sequence 3
0+1i, −1+0i, 1+0i, 0+1i, 1+0i, 0+1i, 0−1i, 1+0i, 1+0i, 0+1i, 0−1i, 1+0i, 0−1i, 1+0i, −1+0i, 0−1i Sequence 4
1+0i, 0−1i, 0−1i, −1+0i, 0−1i, −1+0i, −1+0i, 0+1i, 0−1i, −1+0i, −1+0i, 0+1i, −1+0i, 0+1i, 0+1i, 1+0i However, it will be understood that the complex spreading signal 260 may comprise one of any suitable number of any suitable complex sequences without departing from the scope of this disclosure.

Figure 3:
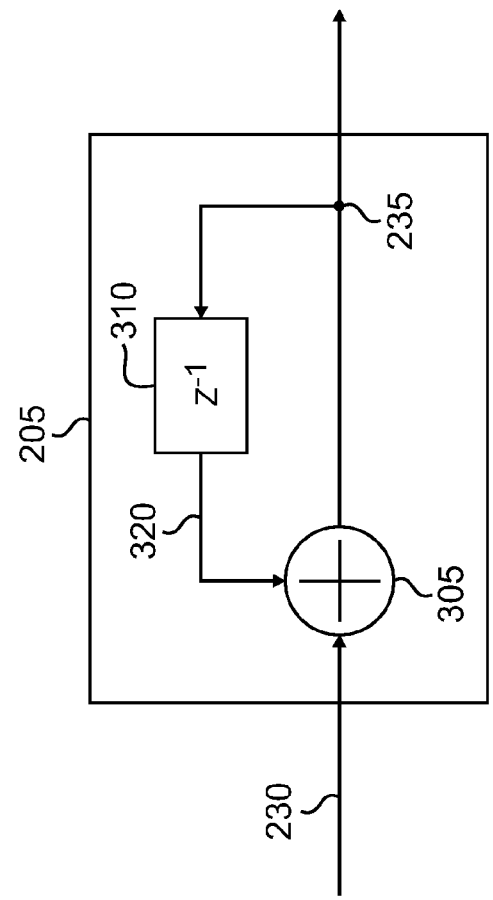
FIG. 3 illustrates details of the encoder of FIG. 2 according to an embodiment of the present disclosure.

FIG. 3 illustrates details of encoder 205 according to an embodiment of the present disclosure. For this embodiment, encoder 205 comprises a binary adder 305 and a delay element 310. Binary adder 305 is operable to add the beacon message 230 to a feedback signal 320 in order to generate the encoded beacon message 235. The encoded beacon message 235 is output to Q-channel modulator 210a (not shown in FIG. 3) and is also fed back to delay element 310. For one embodiment, delay element 310 is operable to delay the encoded beacon message 235 by one bit period in order to generate the feedback signal 320 for binary adder 305.

Figure 4:
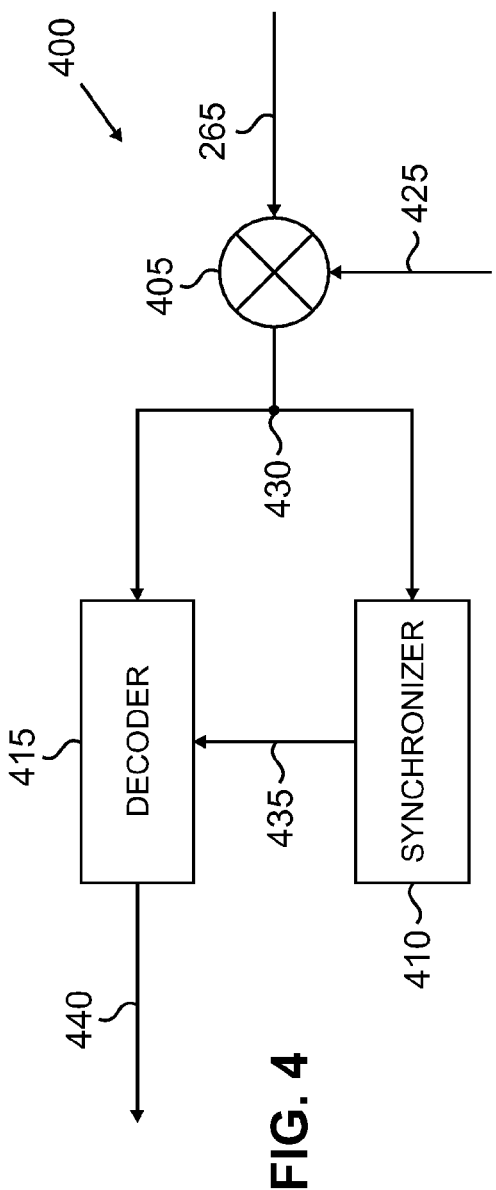
FIG. 4 illustrates a receiver that is capable of receiving and processing a dual-channel beacon signal transmitted by the transmitter of FIG. 2 according to an embodiment of the present disclosure.

FIG. 4 illustrates a receiver 400 that is capable of receiving and processing a dual-channel beacon signal transmitted by transmitter 200 according to an embodiment of the present disclosure. Thus, for one embodiment, receiver 400 may correspond to base station 102, CPE 111 or CPE 112 of FIG. 1.

Receiver 400 comprises a complex despreader 405, a synchronizer 410, and a decoder 415. It will be understood that receiver 400 comprises additional components not illustrated in FIG. 4. For the illustrated embodiment, a dual-channel beacon signal 265 transmitted by transmitter 200 is received at receiver 400.

Complex despreader 405 is operable to receive the dual-channel beacon signal 265, as well as a complex despreading signal 425. The complex despreading signal 425 corresponds to the complex spreading signal 260 used by complex spreader 220 to spread the combined signal 255. Based on the complex despreading signal 425, complex despreader 405 is operable to despread the dual-channel beacon signal 265 in order to generate a despread beacon signal 430, which comprises both the beacon message 230 and the detection signal 245.

Synchronizer 410 is coupled to complex despreader 405 and is operable to receive the despread beacon signal 430 and to detect the presence of the dual-channel beacon signal 265 based on the detection signal 245 included within the despread beacon signal 430. Synchronizer 410 may also operable to determine when a next beacon message 230 begins and to notify decoder 415 when the beacon message 230 begins by sending a begin signal 435 to decoder 415. Decoder 415 is operable to decode the despread beacon signal 430 based on the begin signal 435 in order to generate a decoded beacon message 440, which corresponds to the beacon message 230 included in the dual-channel beacon signal 265 generated by transmitter 200.

As described in more detail below, the despread beacon signal 430 comprises the same beacon message 230 repeated substantially continuously. Thus, the begin signal 435 may be operable to notify decoder 415 when to begin decoding the despread beacon signal 430 in order to decode a beacon message 230 from its beginning. However, it will be understood that decoder 415 may also begin to decode the despread beacon signal 430 at any point, using the begin signal 435 to determine where the beacon message 230 begins. For this embodiment, decoder 415 is operable to generate the decoded beacon message 440 by decoding a second portion of the beacon message 230 followed by a first portion of the beacon message 230 and by rearranging the decoded portions into the proper order based on the begin signal 435. In addition, for the embodiment described below in connection with FIG. 7A, the begin signal 435 may simply be operable to notify decoder 415 of the presence of the dual-channel beacon signal 265, as decoder 415 in this embodiment is operable to identify the beginning of a beacon message 230 based on the format data within each beacon message 230.

Figure 5:
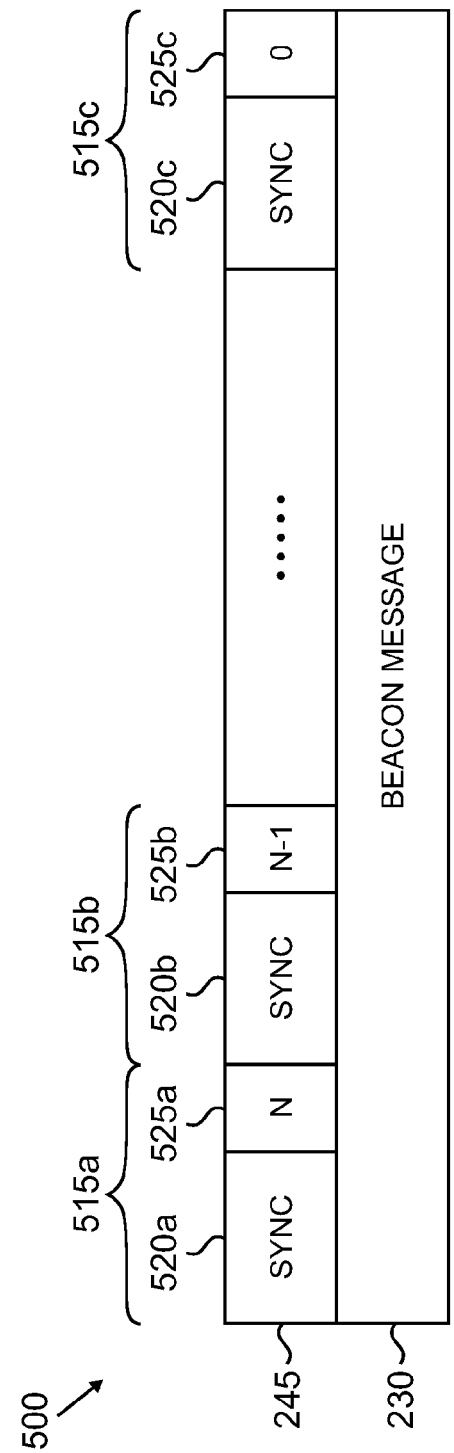
FIG. 5 illustrates a superframe structure for transmitting a dual-channel beacon signal from the transmitter of FIG. 2 according to an embodiment of the present disclosure.

FIG. 5 illustrates a superframe structure 500 for transmitting a dual-channel beacon signal 265 from transmitter 200 according to an embodiment of the present disclosure. The superframe structure 500 comprises a detection signal 245 and a beacon message 230. For this embodiment, the detection signal 245 comprises a synchronization signal.

The detection signal 245 comprises a plurality of synchronization burst sequences 515, each of which comprises a synchronization word 520 and an index value 525 that decrements with each burst transmission. For a particular embodiment, each synchronization word 520 may comprise fifteen bits and each index value 525 may comprise nine bits. However, it will be understood that each synchronization word 520 may comprise any suitable number of bits and each index value 525 may also comprise any suitable number of bits.

The synchronization burst sequences 515 enable a receiver, such as receiver 400, that is asynchronously sampling the channel to quickly detect the dual-channel beacon signal 265 and quickly determine when the next beacon message 230 will begin. The dual-channel beacon signal 265 may be detected quickly because the detection signal 245 is provided substantially continuously instead of being provided only periodically. The beginning of a beacon message 230 may be determined based on the decrementing index value 525, which identifies the start time of the next superframe 500 transmission and thus the start time of the next beacon message 230. Although the illustrated embodiment shows the index value 525 decrementing to a final value of zero, for some embodiments the index value 525 may decrement to a final value of one or other suitable final value.

The number of synchronization burst sequences 515 provided during one superframe 500 (i.e., N+1 for the illustrated embodiment or N for the embodiment in which the final index value 525 is one) is based on the length of the beacon message 230. For one embodiment, the beacon message 230 comprises a physical layer (PHY) service data unit (PSDU). For one particular embodiment, the PSDU may comprise a multiple of three bytes and each synchronization burst sequence 515 may comprise three bytes.

The highest index value 525, N, may vary from 0 to 255 if an 8-bit index value 525 is implemented. Thus, for this embodiment, the beacon message 230 may comprise a size of 3 bytes to 3*(N+1) bytes. However, for one embodiment, the highest index value 525, N, may be limited to a smaller range of $N_1$ to $N_2$. For this embodiment, the beacon message 230 may comprise a size of $3*N_1$ bytes to $3*N_2$ bytes.

Figure 6:
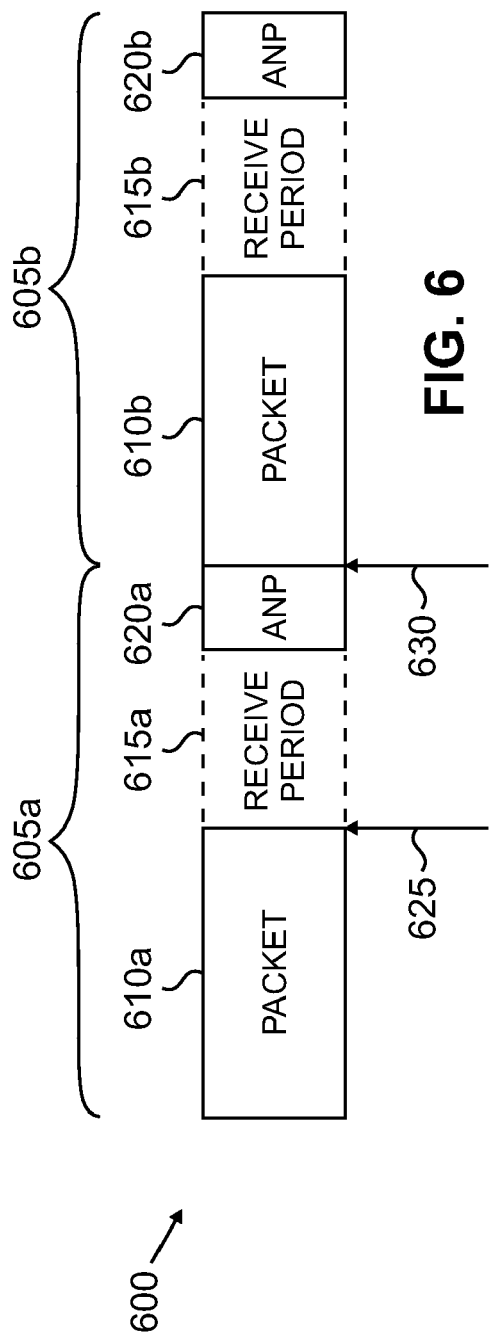
FIG. 6 illustrates a superframe structure for transmitting a dual-channel beacon signal from the transmitter of FIG. 2 according to another embodiment of the present disclosure.
Figure 7:
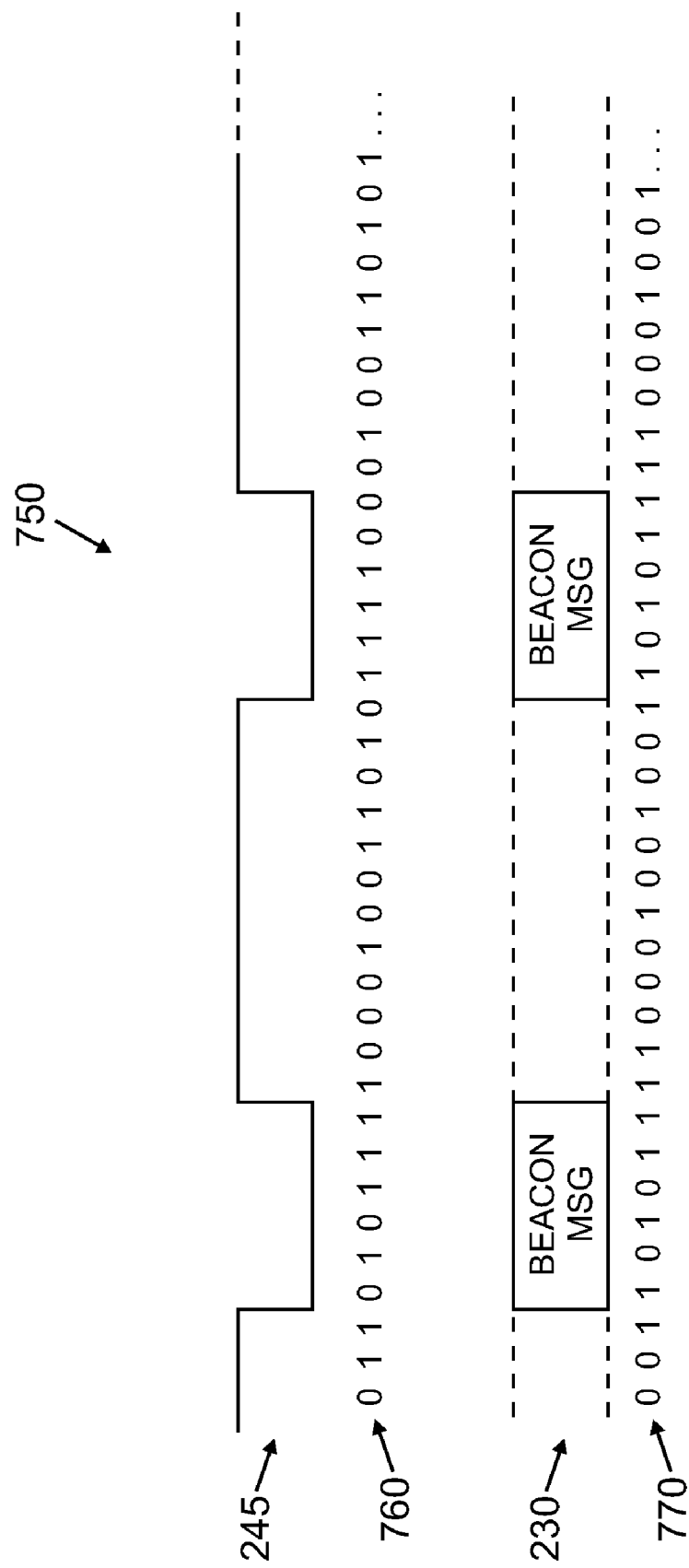
FIGS. 7A-B each illustrate a superframe structure for transmitting a dual-channel beacon signal from the transmitter of FIG. 2 according to other embodiments of the present disclosure.

FIG. 6 illustrates a superframe structure 600 for transmitting a dual-channel beacon signal 265 from transmitter 200 according to another embodiment of the present disclosure. For this embodiment, the detection signal 245 comprises a synchronization signal.

The illustrated superframe structure 600 shows two superframes 605, each of which comprises a packet 610, a receive period 615, and an acknowledgment/no acknowledgment period (ANP) 620. The packet 610 may correspond to the superframe 500 illustrated in FIG. 5. However, for the embodiment of FIG. 6, an optional receive period 615 and an optional ANP 620 are also included. For a particular embodiment of the superframe 605, the packet 610 (i.e., the superframe 500 of FIG. 5) may be implemented with a final index value 525 of one when the optional receive period 615 and ANP 620 are included, and the packet 610 may be implemented with a final index value 525 of zero when the optional receive period 615 and ANP 620 are not included.

During the receive period 615, a secondary protecting device may send a Request to Send (RTS) burst to transmitter 200 (i.e., protecting device 135), which is acting as a primary protecting device. If an RTS burst is received by transmitter 200 during the receive period 615, transmitter 200 may then send an acknowledgment (ACK) message or no acknowledgment (NACK) message during the ANP 620. If transmitter 200 sends an ACK message during the ANP 620, transmitter 200 then yields the following superframe 605 to the secondary protecting device, which transmits its own superframe during that time.

As illustrated in FIG. 6, a receiver, such as receiver 400, may be synchronized with transmitter 200 at a synchronization point 625, which corresponds to the end of the transmission of a packet 610. Thus, receiver 400 is operable to identify the synchronization point 625 based on the decrementing index value 525. In addition, receiver 400 may begin decoding a new beacon message 230 at a begin point 630, which corresponds to the end of the ANP 620. The length of the receive period 615 and of the ANP 620 are known to receiver 400 such that once the synchronization point 625 is found, receiver 400 may determine the location of the begin point 630.

FIGS. 7A-B each illustrate a superframe structure 700, 750 for transmitting a dual-channel beacon signal 265 from transmitter 200 according to other embodiments of the present disclosure. For these embodiments, the beacon message 230 may be transmitted in the traffic channel, while the detection signal 245 comprises a pilot signal that may be transmitted in the pilot channel.

For the embodiment illustrated in FIG. 7A, the detection signal 245 comprises a flat pilot signal. For example, the detection signal 245 may comprise all 1s or all −1s. The detection signal 245 is spread by a PN code 710 before being combined with the beacon message 230, as described in more detail above in connection with FIG. 2. For this embodiment, the beacon message 230 may comprise a type-length-value (TLV) format in which the repeating beacon message 230 includes a type indicator, a length, and a value for each message 230. The beacon message 230 is also spread by a PN code 720 before being combined with the detection signal 245.

For this embodiment, a receiver, such as receiver 400, is operable to detect the dual-channel beacon signal 265 based on the continuously transmitted pilot signal that is included as the detection signal 245 in the pilot channel. Upon detecting the dual-channel beacon signal 265, receiver 400 is operable to decode the beacon message 230 in the traffic channel based on the TLV format of the beacon message 230.

For the embodiment illustrated in FIG. 7B, the detection signal 245 comprises a zig-zag pilot signal. For example, the detection signal 245 may comprise all 1s when the beacon message 230 is empty and may comprise all −1s when the beacon message 230 comprises the actual beacon message data, or vice versa. The detection signal 245 is spread by a PN code 760 before being combined with the beacon message 230, as described in more detail above in connection with FIG. 2. For this embodiment, the beacon message 230 may comprise only the actual beacon message data, as the type and length are unnecessary. Thus, the beacon message 230 may use a fixed message format resulting in a shorter beacon message period as compared to the embodiment illustrated in FIG. 7A. The beacon message 230 is also spread by a PN code 770 before being combined with the detection signal 245.

For this embodiment, a receiver, such as receiver 400, is operable to detect the dual-channel beacon signal 265 based on the continuously transmitted pilot signal that is included as the detection signal 245 in the pilot channel. After detecting the dual-channel beacon signal 265, receiver 400 is operable to detect the beginning of the data in the beacon message 230 based on the change in the pilot signal. Thus, for the illustrated embodiment, when the pilot signal switches from 1s to −1s, receiver 400 is operable to begin decoding the beacon message 230 in the traffic channel.

Figure 8:
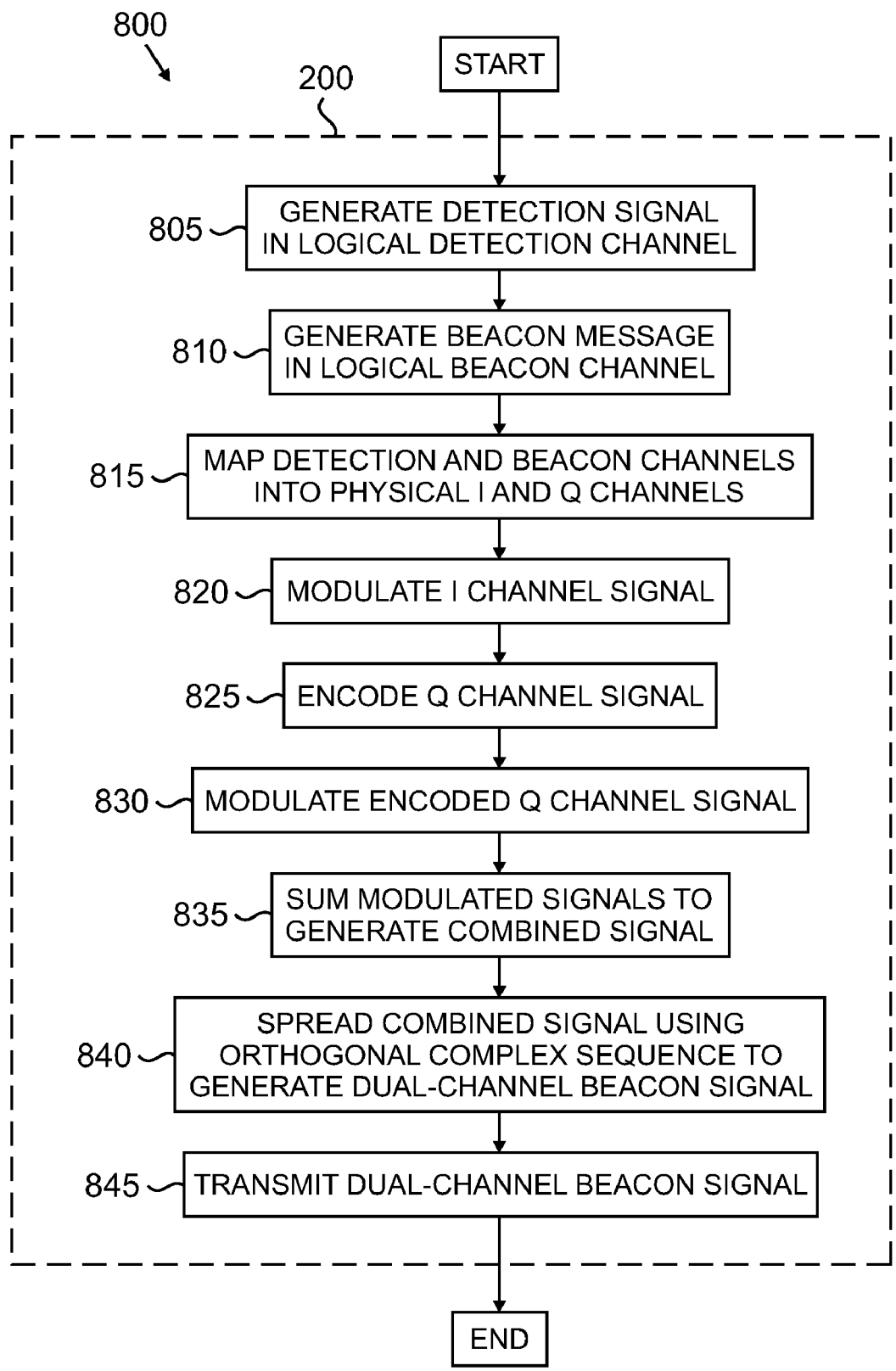
FIG. 8 is a flow diagram illustrating a method for transmitting a dual-channel beacon signal according to an embodiment of the present disclosure.

FIG. 8 is a flow diagram illustrating a method 800 for transmitting a dual-channel beacon signal 265 according to an embodiment of the present disclosure. Initially, transmitter 200 (or protecting device 135) generates a detection signal 245 in a logical detection channel (process step 805) and a beacon message 230 in a logical beacon channel (process step 810) in order to protect a low-power device 125.

The detection channel and beacon channel are mapped into physical I and Q channels in any suitable manner (process step 815). For example, for one embodiment, the detection channel is mapped into the I channel and the beacon channel is mapped into the Q channel. For other embodiments, the detection channel may be mapped into both the I and Q channels and the beacon channel may also be mapped into both the I and Q channels. For another embodiment, the detection channel may be mapped into the Q channel and the beacon channel may be mapped into the I channel.

Modulator 210b modulates the I channel signal 245 (process step 820). For example, for the embodiment in which the detection channel is mapped into the I channel and the beacon channel is mapped into the Q channel, modulator 210b modulates the detection signal 245 to generate a modulated detection signal 250.

Encoder 205 encodes the Q channel signal 230 (process step 825) and modulator 210a modulates the encoded Q channel signal 235 (process step 830). For example, for the embodiment in which the detection channel is mapped into the I channel and the beacon channel is mapped into the Q channel, encoder 205 encodes the beacon message 230 and modulator 210a modulates the encoded beacon message 235 to generate a modulated beacon message 240.

Adder 215 sums the modulated signals 240 and 250 to generate a combined signal 255 (process step 835). Complex spreader 220 then spreads the combined signal 255 using a complex sequence to generate a dual-channel beacon signal 265 that comprises both the I channel signal 245 (e.g., the detection signal) and the Q channel signal 230 (e.g., the beacon message) (process step 840). Transmitter 200 then transmits the dual-channel beacon signal 265, which protects the low-power device 125 (process step 845), and the method comes to an end.

Figure 9:
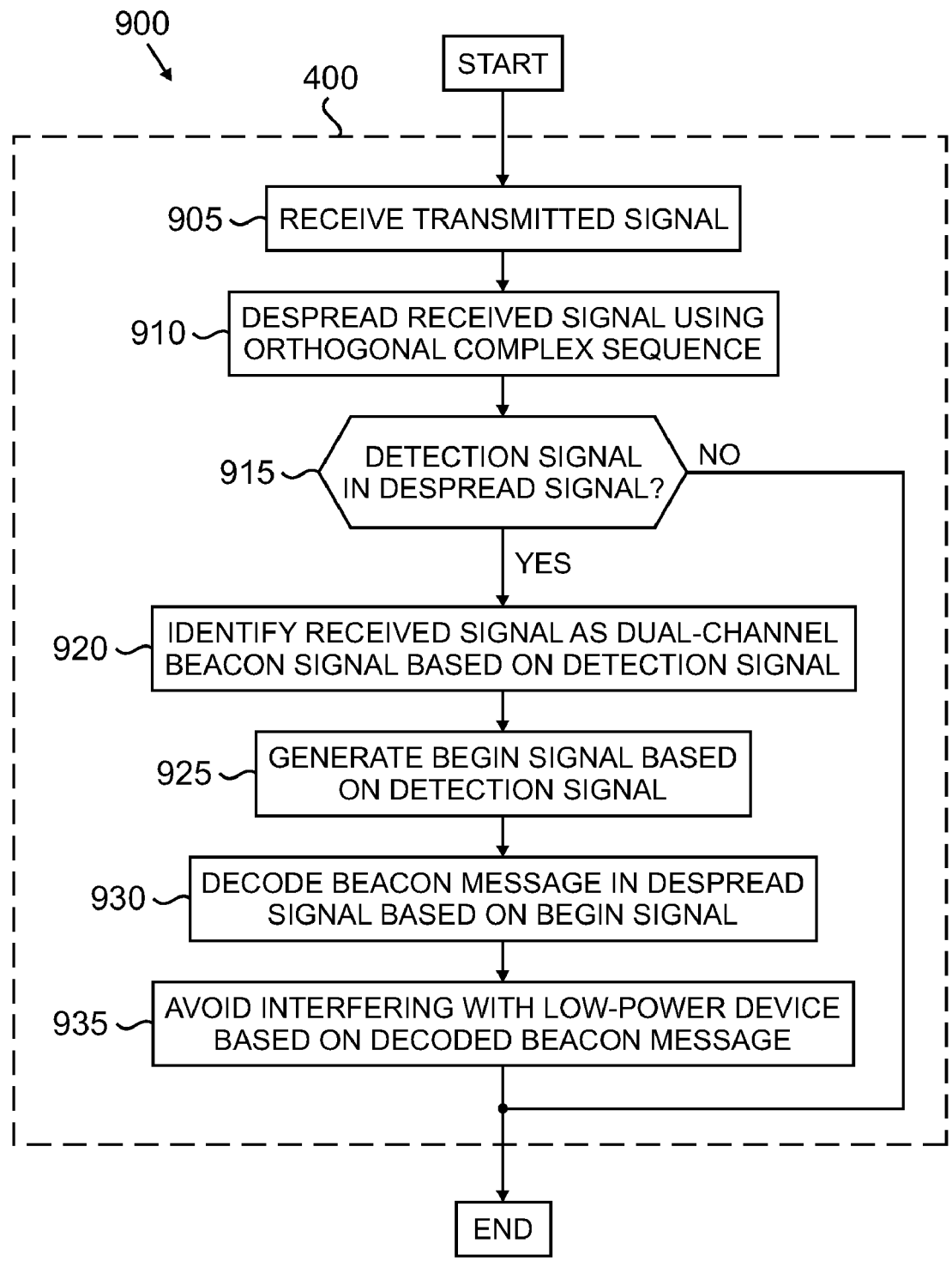
FIG. 9 is a flow diagram illustrating a method for receiving and processing a dual-channel beacon signal according to an embodiment of the disclosure.

FIG. 9 is a flow diagram illustrating a method 900 for receiving and processing a dual-channel beacon signal 265 according to an embodiment of the disclosure. Initially, a receiver 400 receives a transmitted signal (process step 905). Complex despreader 405 despreads the received signal using a complex sequence to generate a despread signal 430 (process step 910).

Synchronizer 410 determines whether or not a detection signal 245 is included within the despread signal 430 (process step 915). If no detection signal 245 is detected by synchronizer 410 (process step 915), the received signal is not a dual-channel beacon signal 265 and the method comes to an end. However, if a detection signal 245 is detected by synchronizer 410 (process step 915), synchronizer 410 identifies the received signal as a dual-channel beacon signal 265 based on the presence of the detection signal 245 (process step 920).

Synchronizer 410 then generates a begin signal 435 based on the detection signal 245 (process step 925). For example, for the embodiment illustrated in FIG. 5, synchronizer 410 may generate the begin signal 435 when the index value 525 decrements to a final value. For another example, for the embodiment illustrated in FIG. 6, synchronizer 410 may generate the begin signal 435 at the synchronization point 625 or at the begin point 630. For yet another example, for the embodiment illustrated in FIG. 7A, synchronizer 410 may generate the begin signal 435 as soon as the detection signal 245 is detected. For still another example, for the embodiment illustrated in FIG. 7B, synchronizer 410 may generate the begin signal 435 when the pilot signal (i.e., the detection signal 245) flips from 1s to −1s, or vice versa.

Decoder 415 decodes the beacon message 230 included in the despread signal 430 based on the begin signal 435 from synchronizer 410 (process step 930). For example, for any of the embodiments illustrated in FIG. 5, 6, 7A or 7B, decoder 415 may begin decoding the beacon message 230 as soon as the begin signal 435 is received. For another embodiment, decoder 415 may begin decoding the beacon message 230 at any other suitable time. For example, decoder 415 may begin decoding the beacon message 230 in the middle of the beacon message 230, determine where the beginning of the beacon message 230 is when the begin signal 435 is received, and then rearrange the portion of the beacon message 230 decoded before the begin signal 435 is received and the portion of the beacon message 230 decoded after the begin signal 435 is received. It will be understood that decoder 415 may decode the beacon message 230 in any other suitable manner.

After decoding the beacon message 230, receiver 400 avoids interfering with the low-power device 125 protected by the dual-channel beacon signal 265 based on the data included in the decoded beacon message 440 (process step 935), and the method comes to an end.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a dual-channel beacon signal to protect a low-power device in a wireless network, the method comprising:
    generating a beacon message in a first logical channel, the beacon message comprising information associated with the low-power device;
    generating a detection signal in a second logical channel;
    mapping a first portion of the first logical channel into a first physical channel and a second portion of the first logical channel into a second physical channel, the second physical channel orthogonal to the first physical channel;
    mapping a first portion of the second logical channel into the first physical channel and a second portion of the second logical channel into the second physical channel;
    encoding and modulating data in the first physical channel to generate a first modulated signal;
    modulating data in the second physical channel to generate a second modulated signal;
    summing the first and second modulated signals to generate a combined signal;
    spreading the combined signal to generate the dual-channel beacon signal; and
    transmitting the dual-channel beacon signal in the first physical channel and the second physical channel.

2. The method as set forth in claim 1, wherein at least one of the first physical channel and the second physical channel is the same as a channel in which the low-power device is operating.

3. The method as set forth in claim 1, wherein encoding comprises encoding data in the first physical channel using a feedback signal generated by a delay element.

4. The method as set forth in claim 3, wherein spreading the combined signal comprises spreading using a complex sequence to generate the dual-channel beacon signal.

5. The method as set forth in claim 1, the information associated with the low-power device comprising at least one of: a physical location, an estimated duration of channel occupancy, and a height of a transmitter.

6. The method as set forth in claim 4, further comprising selecting the complex sequence from a plurality of possible complex sequences.

7. The method as set forth in claim 1, the detection signal comprising a synchronization signal, the synchronization signal comprising a plurality of synchronization burst sequences, each synchronization burst sequence comprising a synchronization word and a decrementing index value wherein at least one of the first physical channel and the second physical channel is the same as a channel in which the low-power device is operating.

8. The method as set forth in claim 1, the detection signal comprising a flat pilot signal.

9. The method as set forth in claim 1, the detection signal comprising a zigzag pilot signal.

10. A method for processing a dual-channel beacon signal transmitted to protect a low-power device in a wireless network, the method comprising:
    receiving the dual-channel beacon signal on first and second physical channels, the dual-channel beacon signal comprising a detection signal and a beacon message transmitted simultaneously, the beacon message comprising information associated with the low-power device, the beacon signal in the first physical channel encoded using a feedback signal generated by a delay element, the first physical channel comprising a first modulated signal that comprises a first portion of the detection signal and a first portion of the beacon message, the second physical channel comprising a second modulated signal that comprises a second portion of the detection signal and a second portion of the beacon message, the second physical channel orthogonal to the first physical channel;
    despreading the dual-channel beacon signal using a complex sequence;
    identifying the dual-channel beacon signal based on the detection signal; and
    avoiding interference with the low-power device based on the beacon message.

11. The method as set forth in claim 10, further comprising generating a begin signal based on the detection signal.

12. The method as set forth in claim 11, further comprising decoding the beacon message based on the begin signal.

13. The method as set forth in claim 11, the detection signal comprising a synchronization signal, the synchronization signal comprising a plurality of synchronization burst sequences, each synchronization burst sequence comprising a synchronization word and a decrementing index value, generating the begin signal based on the detection signal comprising generating the begin signal when the index value reaches a predetermined final value.

14. The method as set forth in claim 11, the detection signal comprising a flat pilot signal, generating the begin signal based on the detection signal comprising generating the begin signal when the dual-channel beacon signal is identified.

15. The method as set forth in claim 11, the detection signal comprising a zig-zag pilot signal, generating the begin signal based on the detection signal comprising generating the begin signal when the pilot signal switches from a first value to a second value.

16. A transmitter capable of providing a dual-channel beacon signal to protect a low-power device in a wireless network, comprising:
    an encoder configured to encode data in a first physical channel to generate an encoded signal, the encoder comprising a delay element configured to generate a feedback signal;
    a first modulator coupled to the encoder, the first modulator configured to modulate the encoded signal to generate a first modulated signal;
    a second modulator configured to modulate data in a second physical channel to generate a second modulated signal, the second physical channel orthogonal to the first physical channel;
    an adder coupled to the first and second modulators, the adder configured to sum the first and second modulated signals to generate a combined signal; and
    a complex spreader coupled to the adder, the complex spreader configured to spread the combined signal using a complex sequence to generate the dual-channel beacon signal, the dual-channel beacon signal comprising a beacon message and a detection signal, the beacon message comprising information associated with the low-power device,
    wherein the transmitter is configured to transmit the dual-channel beacon signal in the first physical channel and the second physical channel, the data in the first physical channel comprising a first portion of the beacon message and a first portion of the detection signal, and the data in the second physical channel comprising a second portion of the beacon message and a second portion of the detection signal.

17. The transmitter as set forth in claim 16, the data in the first physical channel comprising the beacon message, and the data in the second physical channel comprising the detection signal.

18. The transmitter as set forth in claim 16, wherein at least one of the first physical channel and the second physical channel is the same as a channel in which the low-power device is operating.

19. The transmitter as set forth in claim 16, the encoder further comprising a binary adder configured to add the feedback signal to the beacon message.

20. The transmitter as set forth in claim 16, the first modulator and the second modulator each comprising one of a binary phase shift keying modulator, a differential binary phase shift keying modulator, and a differential quadrature phase shift keying modulator.

21. The transmitter as set forth in claim 16, the complex sequence comprising a predetermined sequence.

22. The transmitter as set forth in claim 16, the complex sequence selected from a plurality of possible complex sequences.

23. The transmitter as set forth in claim 16, the detection signal comprising a synchronization signal, the synchronization signal comprising a plurality of synchronization burst sequences, each synchronization burst sequence comprising a synchronization word and a decrementing index value.

24. The transmitter as set forth in claim 16, the detection signal comprising a flat pilot signal.

25. The transmitter as set forth in claim 16, the detection signal comprising a zig-zag pilot signal.

* * * * *